United States Patent [19]

Jubran et al.

[11] Patent Number: 5,056,225
[45] Date of Patent: Oct. 15, 1991

[54] FLAT SCRAPER TOOL

[75] Inventors: William Jubran, Meiliya, Israel; Andre Carossino, Louveciennes, France

[73] Assignee: Vargus Ltd, Nahariya, Israel

[21] Appl. No.: 576,868

[22] Filed: Sep. 4, 1990

[30] Foreign Application Priority Data

Sep. 8, 1989 [IL] Israel ..................................... 91568

[51] Int. Cl.$^5$ ..................... B26B 3/00; A47L 13/02; A61C 3/02
[52] U.S. Cl. ................................. 30/169; 15/236.01; 433/165
[58] Field of Search .................. 30/169, 172, 317; 433/165; 29/90.01; 15/236.01, 236.02

[56] References Cited

U.S. PATENT DOCUMENTS 1,512,920 10/1984 Galvin ................................... 30/169
2,695,452 11/1954 Christian ............................. 433/165
4,202,093 5/1980 Wallerstein ....................... 15/236.01
4,495,670 1/1985 Baker .................................. 15/236.02
4,870,712 10/1989 Markus ............................. 15/236.02

Primary Examiner—Frank T. Yost
Assistant Examiner—Paul M. Heyrana, Sr.
Attorney, Agent, or Firm—Benjamin J. Barish

[57] ABSTRACT

A scraper tool particularly useful for hand deburring various surfaces at different cutting angles, includes a scraper blade of rectangular section defining four continuous sharp edges extending axially of the scraper blade. The thickness of the rectangular section is preferably larger along one transverse dimension than along the other transverse dimension of the section, with the larger dimension decreasing from one end of the scraper blade to the opposite end. The front face of the front end of the scraper blade is of rectangular configuration and forms an oblique angle to the plane passing perpendicularly through the scraper blade, thereby forming four additional sharp edges extending peripherally around the scraper blade.

15 Claims, 1 Drawing Sheet

FLAT SCRAPER TOOL

RELATED APPLICATIONS

The present application is related to our patent application Ser. No. 07/576,816 for Triangular Scraper Tool, and our application Ser. No. 07/576,815 for Round Scraper Tool, both filed the same date as the present application.

FIELD AND BACKGROUND OF THE INVENTION

The present invention relates to scraper tools such as are used for deburring holes or other surfaces in machined workpieces.

After a workpiece is machined, drilled or grooved, it is frequently necessary to perform a deburring operation in order to remove burrs and to smoothen its surface. A number of hand deburring tools have been developed for this purpose, but the known tools are generally not efficiently applicable for deburring many different types of machined surfaces.

OBJECTS AND BRIEF SUMMARY OF THE INVENTION

An object of the present invention is to provide a scraper tool which can be efficiently used for deburring various types of machined surfaces.

According to the present invention, there is provided a scraper tool particularly useful for hand deburring various surfaces at different cutting angles, comprising a scraper blade at the front end of the tool joined to a handle at the back end of the tool. The scraper blade is of rectangular section defining four continuous sharp edges extending axially of the scraper blade. The thickness of the rectangular section is preferably larger along one transverse dimension (e.g., width) than along the other transverse dimension (e.g., height) of the section, with the larger dimension decreasing from one end of the scraper blade to the opposite end. The front face of the front end of the scraper blade is of rectangular configuration and forms an oblique angle to the plane passing perpendicularly through the scraper blade, thereby forming four additional sharp edges extending peripherally around the scraper blade.

According to further features in the described preferred embodiment, the thickness of the rectangular section of the scraper blade along its larger transverse dimension decreases from the front end to the back end where joined to the handle, such as to form an angle of 2-10 degrees with respect to the longitudianl axis of the scraper blade. Preferably, this angle is about 4 degrees. In the described embodiment, the thickness of the rectangular section of the scraper blade is uniform along its smaller transverse dimension from the front end to its back end joined to the handle.

A scraper blade constructed in accordance with the foregoing features is particularly useful for hand deburring and smoothing various machined surfaces, including internal straight angles and sharp corners. Because of its special geometry it can present different cutting angles, and can be used with different materials, including steel, aluminum, cast iron, brass, and plastics, and for cutting operations which produce the both long chips and small chips.

Further features and advantages of the invention will be apparent from the description below.

BRIEF DESCRIPTION OF THE DRAWINGS

The invention is herein described, by way of example only, with reference to the accompanying drawings, wherein.

DESCRIPTION OF A PREFERRED EMBODIMENT

Figure 1:
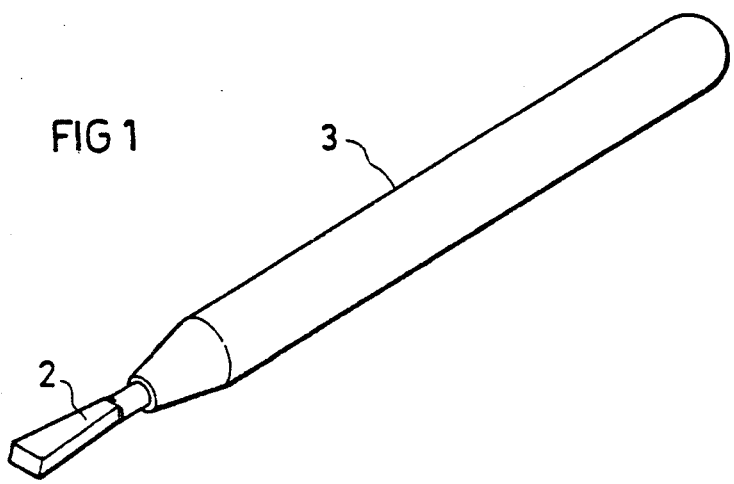
FIG. 1 a three-dimensional view illustrating one form of flat scraper tool constructed in accordance with the present invention.

The scraper tool illustrated in the drawing is particularly useful for hand deburring, straightening, or smoothing various types of machined surfaces, including those having straight angles and sharp corners. It is constituted of two main elements, namely a scraper blade 2 at the front end of the tool and a handle 3 at the back end. The scraper blade 2 is made of hard steel, and the handle 3 is made of aluminum.

Figure 2:
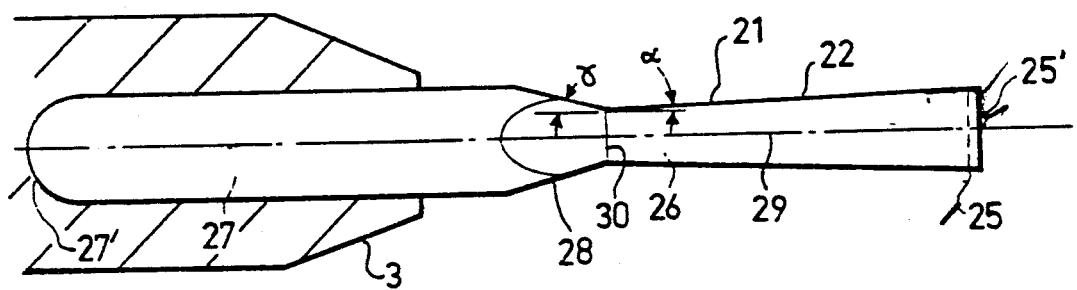
FIG. 2 is an enlarged, fragmentary side-elevational view illustrating primarily the scraper blade in the tool of FIG. 1.
Figure 3:
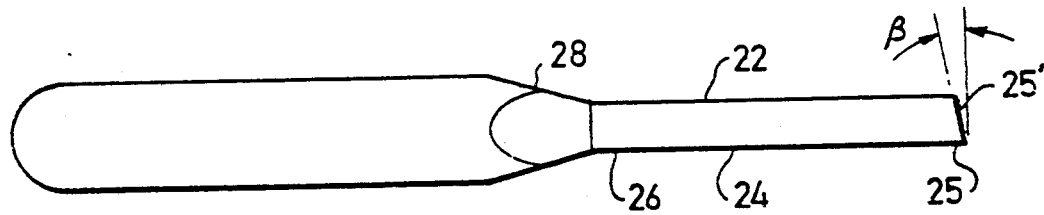
FIG. 3 is a full side elevational view of the scraper blade of FIG. 2 but rotated 90 degrees.
Figure 4:
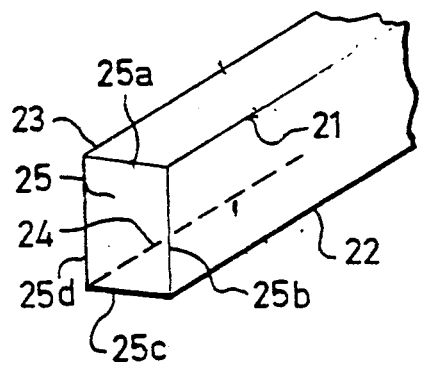
FIG. 4 is an enlarged view of the front oblique face of the scraper blade.

As shown particularly in FIGS. 2-4, the scraper blade 2 is of rectangular cross-section, defining four continuous sharp edges 21-24 extending axially of the scraper blade. FIGS. 2 and 3, respectively, illustrate the thickness of the rectangular section of the scraper blade 2 along the two transverse dimensions. At the outer or front end 25 of the blade, the thickness along the transverse dimension illustrated in FIG. 2 is larger than the thickness along the transverse dimension illustrated in FIG. 3, and decreases from the front end 25 to the back end 26, defining an angle "α" of 2-6 degrees, preferably 4 degrees, with the longitudinal axis 29. By this construction, simply grinding the oblique front face of the tool enables a wide range of rectangular sections to be offered. The back end 26 is joined to a shank 27 for fixing the scraper blade to the handle 3.

The front face 25' at the front end 25 of the scraper blade 2 is cut at a bias to form an oblique angle, shown at "β" in FIG. 3, to the plane passing perpendicularly through the scraper blade 2. The oblique face 25' thus defines four additional sharp edges 25a-25d around the periphery of the scraper blade. Preferably, angle "β" is from 5-45 degrees, an angle of 10 degrees has been found particularly effective.

Shank 27 joined to the back end 26 of scraper blade 2 is of cylindrical configuration. Its outer end is semispherical as shown at 27', and its inner end joined to the back end 26 of the scraper blade 2 is tapered, as shown at 28, to form a back angle "γ" with respect to its longitudinal axis 29 which is preferably between 20-40 degrees, a back angle of 15 degrees has been found particularly effective.

The axial length of scraper blade 2 to its juncture line 30 with shank 27 is 10-15 mm, preferably about 12 mm. The thickness of the scraper blade 2 along the larger transverse dimension as illustrated in FIG. 2 varies linearly from its outer face 25 to its juncture line 30 with shank 27. Preferably, the thickness along this larger transverse dimension is 2.2-2.7 mm at the front face 25' and decreases linearly to 1.4-1.8 mm at the juncture line 30 with shank 27. The thickness of the scraper blade 2 along the smaller transverse dimension as illustrated in FIG. 3 is uniform for its complete length, preferably being 1.2–1.6 mm. In the described preferred embodiment, the front face 25' of scraper blade 2 is 2.5 mm along the larger transverse dimension (FIG. 2) decreasing linearly to 1.6 mm at the juncture line 30, and is 1.4 mm along its smaller transverse dimension (FIG. 3) for its complete length.

Shank 27 has a diameter of 3–3.4 mm, preferably 3.2 mm. The length of the shank 27 from its outer end 27' to juncture line 30 is 16–20 mm, preferably 18 mm; and the length of scraper blade 2 from its front face 25' to juncture line 30 is 10–14 mm, preferably 12 mm.

The scraper tool illustrated in the drawings may be used for deburring, smoothing, and straigthening various types of machined surfaces including internal straight angles and sharp corners. Its four long cutting edges 21–24, and its four short cutting edges 25a–25d may be applied to different areas, at different cutting angles, and with different relief angles. This makes the tool universally applicable not only for deburring different machined surfaces, but also for deburring different kinds of materials, such as steel, aluminum, cast iron, brass, plastics,etc.

While the invention has been described with respect to a preferred embodiment, it will be appreciated that this is described for purposes of example, and that many other variations, modifications and applications of the invention may be made.

What is claimed is:

1. A scraper tool particularly useful for hand deburring various surfaces at different cutting angles, comprising:
    a scraper blade at the front end of the tool joined to a handle at the back end of the tool;
    said scraper blade being of rectangular section defining four continuous sharp edges extending axially of the scraper blade;
    the front face of the front end of the scraper blade being of rectangular configuration and forming an oblique angle to the plane passing perpendicularly through the scraper blade forming four additional sharp edges extending peripherially around the scraper blade.

2. The scraper tool according to claim 1, wherein the thickness of the rectangular section is larger along one transverse dimension than along the other transverse dimension of the section, with the larger dimension decreasing from one end of the scraper blade to the opposite end.

3. The scraper tool according to claim 2, wherein the thickness of the rectangular section along its larger transverse dimension decreases from the front end of the scraper blade to the back end where joined to the handle.

4. The scraper blade according to claim 3, wherein the thickness of the rectangular section of the scraper blade along its larger transverse dimension decreases from the front end thereof to the back end so as to form an angle of 2–6 degrees with respect to the longitudinal axis of the scraper blade.

5. The scraper tool according to claim 4, wherein said angle is 4 degrees.

6. The scraper tool according to claim 2, wherein the thickness of the rectangular section of the scraper blade along its smaller transverse dimension is uniform from the front end thereof to the back end thereof joined to the handle.

7. The scraper tool according to claim 2, wherein the thickness of the scraper blade along its larger transverse dimension varies from 2.2–2.7 at the front face to 1.4–1.8 at the juncture with the handle, and its thickness along its smaller transverse dimension is from 1.6–2 mm.

8. The scraper tool according to claim 7, wherein the thickness of the scraper blade along the larger transverse dimension is approximately 2.5 mm at the front face and 1.6 mm at its juncture with the handle, and wherein the thickness of the scraper blade along the smaller transverse dimension is approximately 1.4 mm.

9. The scraper tool according to claim 1, wherein said oblique angle of the front face of the scraper blade is 5–15 degrees.

10. The scraper tool according to claim 9, wherein the oblique angle is approximately 10 degrees.

11. The scraper tool according to claim 1, wherein the back end of the scraper blade is joined to the handle by a shank of cylindrical cross-section integrally formed with the scraper blade.

12. The scraper tool according to claim 11, wherein said shank has a diameter of 3—3.4 mm.

13. The scraper tool according to claim 12, wherein said shank has a diameter of 3.2 mm.

14. The scraper tool according to claim 1, wherein the scraper blade is made of hard steel.

15. The scraper tool according to claim 1, wherein the handle is of aluminum.

* * * * *